United States Patent Office 3,262,928
Patented July 26, 1966

3,262,928
PROCESS FOR THE PRODUCTION OF SODIUM
α-AMINOBENZYLPENICILLIN
Edmund Stanley Granatek, Baldwinsville, N.Y., assignor to Bristol-Myers Company, New York, N.Y., a corporation of Delaware
No Drawing. Filed Mar. 29, 1963, Ser. No. 269,132
2 Claims. (Cl. 260—239.1)

This invention relates to a process for making synthetic compounds which are of value as antibacterial agents, as nutritional supplements in animal feeds, as agents for the treatment of mastitis in cattle, as therapeutic agents in poultry and animals, including man and in the treatment especially of infectious diseases caused by Gram-positive and Gram-negative bacteria. More particularly, this invention relates to a method of making alkali metal salts of α-aminophenylmethyl and α-amino-substituted-phenylmethyl penicillins.

Antibacterial agents such as benzylpenicillin have proved highly effective in the past in therapy of infections due to Gram-positive bacteria, but such agents suffer from the serious drawbacks of being ineffective against numerous strains of bacteria, e.g., most Gram-negative bacteria. The compounds produced by the practice of the present invention are particularly useful in that they possess potent antibacterial activity against both Gram-positive and Gram-negative bacteria upon either parenteral or oral administration and also exhibit resistance to destruction by acid.

α-Aminobenzylpenicillin and α-amino-substituted-benzylpenicillins are known in the technical literature, having been described for example, in United States Patent No. 2,985,648, the disclosure of which is incorporated herein by reference. According to the teachings of that patent, the penicillins are prepared by reaction of 6-aminopenicillanic acid with an acylating agent such as the acid chloride, acid bromide, acid anhydride, mixed anhydride, etc. of a derivative of α-aminophenylacetic or α-amino-substituted-phenylacetic acid in which the amino group is protected by a carbobenzoxy or other suitable protecting groups. After completion of the acylation reaction the protecting group is removed from the amino group by reduction with hydrogen in the presence of a catalyst.

α-Aminophenylmethyl penicillins such as α-aminobenzylpenicillin are administered either orally in the form of capsules, tablets or aqueous suspensions or intramuscularly in the form of an aqueous suspension. These compounds cannot be administered intravenously because of their relatively low solubility in water. Alkali metal salts, such as the sodium salt of α-aminophenylmethyl penicillins, are more soluble than the free acid in water; however, when the alkali metal salt of an α-aminophenylmethyl penicillin is formed in aqueous solution, such as by the reaction of an alkali metal hydroxide with the free acid in an aqueous reaction medium, the resultant product after isolation by known methods does not have a satisfactory potency, i.e., is impure.

It is an object of this invention to provide a method of making an alkali metal salt and particularly a sodium salt of α-aminophenylmethyl or α-amino-substituted-phenylmethyl penicillin, which salt possesses substantially theoretical potency.

Hereinafter, the term "α-aminobenzylpenicillin" is intended to include α-amino-substituted-benzylpenicillins as well as α-aminobenzylpenicillin per se.

These and other objects are achieved by the practice of this invention which, briefly, comprises reacting a triethylamine salt of an α-aminobenzylpenicillin having the formula Formula I

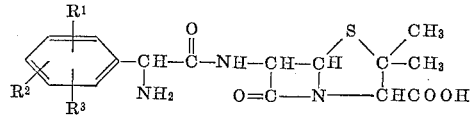

wherein $R^1$, $R^2$ and $R^3$ each represent a member selected from the group consisting of hydrogen, nitro, di(lower)-alkylamino, (lower)alkanoylamino, (lower)alkanoyloxy, (lower) alkyl (including straight and branched chain saturated aliphatic groups having from 1 to 6 carbon atoms inclusive), (lower)alkoxy, sulfamyl, chloro, iodo, bromo, fluoro, trifluoromethyl, (lower)alkylthio, (lower)alkylsulfonyl, carbo(lower)alkoxy, benzyl, phenethyl, cycloheptyl, cyclohexyl and cyclopentyl with an alkali metal 2-ethylhexanoate in a reaction medium comprising substantially anhydrous methylene chloride.

The α-carbon atoms of the acyl group (to which the amine group is attached) is an asymmetric carbon atom and the compounds of this invention can therefore exist in two optically active isomeric forms (the D- and L-diasteroisomers), as well as in a mixture of the two optically active forms; all such isomeric forms of the compounds may be used in the practice of the present invention.

It should be noted in connection with the foregoing consideration of the diastereoisomers of this invention that many isomers other than the two caused by the asymmetric carbon of the side chain or possible due to the presence of asymmetric carbon atoms in the 6-aminopenicillanic nucleus. Such additional isomers, however, are not presently signicant since 6-aminopenicillanic acid, which is the product of fermentation processes, is consistently of one configuration; such 6-aminopenicillanic acid is presently used in the production of the compounds of this invention.

The α-aminobenzylpenicillins used in the practice of this invention are preferably of the D-(—) configuration.

The triethylamine salt of the α-aminobenzylpenicillin may be prepared by reacting triethylamine with an α-aminobenzylpenicillin represented by Formula I above in substantially anhydrous methylene chloride. The triethylamine salt of the α-aminobenzylpenicillin is soluble in this solution and the subsequent reaction with an alkali metal 2-ethylhexanoate may be accomplished in this same reaction medium without isolating the triethylamine salt.

The triethylamine salt of the α-aminobenzylpenicillin may be first isolated in crystalline form before it is reacted with the alkali metal 2-ethylhexanoate. This may be accomplished by reacting triethylamine with an α-aminobenzylpenicillin aryl sulfonate having the formula

FORMULA II

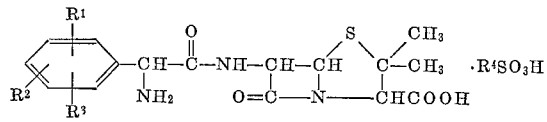

wherein $R^1$, $R^2$ and $R^3$ have the meaning set forth above and wherein $R^4$ represents a member selected from the group consisting of radicals having the formulae

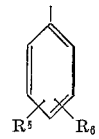

and

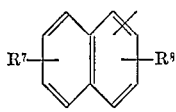

in which $R^5$, $R^6$, $R^7$ and $R^8$ are members selected from the group consisting of hydrogen, alkyl containing from 1 to 12 carbon atoms (including straight and branched chain groups), (lower)alkoxy, (lower)alkylthio, nitro, (lower)-alkanoylamine, (lower)alkanoyloxy, sulfamyl, chloro, iodo, bromo, fluoro, trifluoromethyl, (lower)alkylsulfonyl, carbo(lower)alkoxy, benzyl, phenethyl, cycloheptyl, cyclohexyl and cyclopentyl.

Compounds of the type represented by Formula II may be prepared by contacting an α-aminobenzylpenicillin of Formula I with a water-soluble aryl sulfonic acid or salt thereof having the formula $(R^4-SO_3)_xM$ wherein M is a radical selected from the group consisting of hydrogen, ammonium, substituted ammonium, the alkali metals and the alkaline earth metals, wherein $x$ is a whole number equal to the valence of M and wherein $R^4$ is the same as defined above. Specific aryl sulfonic acids which may be used include naphthalene sulfonic acid, p-nonylbenzene sulfonic acid, p-toluene sulfonic acid and p-cymene sulfonic acid. The aryl sulfonic acids which may be used are described in the prior art and many of them are commercially available.

The triethylamine salt of an α-aminobenzylpenicillin is reacted with the alkali metal 2-ethylhexanoate (preferably sodium 2-ethylhexanoate) in substantially anhydrous methylene chloride. The expression "substantially anhydrous methylene chloride" is intended to include methylene chloride which contains not more than about 0.2% by weight moisture and preferably not more than 0.10% by weight of moisture. If more than this amount of moisture is present in the reaction medium, the resultant product does not have a sufficiently high potency and the advantages of this invention are not obtained.

In a preferred embodiment of this invention the methylene chloride reaction medium contains about 0.08% by weight of moisture. If the reaction medium contains less than 0.04% by weight of moisture, the sodium salt of the α-aminobenzylpenicillin may be obtained in a colloidal state which renders recovery of the product by filtration difficult.

Crystallization of the alkali metal salt of the α-aminobenzylpenicillin from the reaction medium may be initiated, if necessary, by seeding. The temperature of the reaction medium during crystallization is preferably within the range of from about 15 to 25° C. After precipitation of the product is completed, it may be recovered by any suitable means such as by filtration. The product may then be washed with methylene chloride and subsequently dried.

The alkali metal salts and particularly the sodium salts of an α-aminobenzylpenicillin which are produced in accordance with the process of this invention possess valuable antibacterial properties. The activities of these compounds compare favorably with the corresponding α-aminobenzylpenicillin. Moreover, the sodium salts generally give higher blood levels than do the corresponding α-aminobenzylpenicillins. Furthermore, since they are more water-soluble than the corresponding α-aminobenzylpenicillin, they may be given as intravenous solutions as well as intramuscularly. The sodium salt of α-aminobenzylpenicillin is generally administered in an amount of from about 10–30 mgm./kg./day, and preferably about 15, administered in divided dosage, e.g. four times a day.

It is preferred to maintain these compounds in a dry state until shortly before their use. Then, they may be reconstituted with water and administered.

The following examples illustrate the best modes contemplated for carrying out this invention.

*Example 1*

Triethylamine (121.5 cc.) is dissolved in 6 liters of methylene chloride. There are then added 150 g. of α-aminobenzylpenicillin and the mixture is stirred for one hour. The mixture is then filtered to remove undissolved material and the filtrate is warmed to 26° C. There are then added 219.24 cc. of 42.3% by weight solution of sodium 2-ethylhexanoate in anhydrous n-butanol. The solution at first becomes cloudy and then clears with stirring. The solution is then allowed to stand for 4 hours at room temperature. The solution is then filtered and the filter cake is washed twice with methylene chloride. The product, the sodium salt of α-aminobenzylpenicillin, is vacuum dried at 40° C. for 48 hours, screened through a 60-mesh screen and dried for an additional 6 hours at 40° C. The product (131 gm.) is found to have a potency of 890 mcg./mg. versus α-aminobenzylpenicillins.

*Example 2*

Triethylamine (29 gm.) is dissolved in 2 liters of methylene chloride. To this solution there is added 50 g. of α-aminobenzylpenicillin and the mixture is mixed for 15 minutes and filtered. To the filtrate there is added a 30% solution of potassium 2-ethylhexanoate in butanol. The resultant product is recovered by filtration, washed with methylene chloride and dried overnight at 40° C. in a vacuum oven. The product is the potassium salt of α-aminobenzylpenicillin.

*Example 3*

α - Aminobenzylpenicillin - β - naphthalene sulfonate (2000 g.) is added to 12940 ml. of tert.-butyl alcohol with stirring. The temperature of the slurry is adjusted to 25° C. and 1500 ml. of triethylamine are added. The mixture is stirred for 3 hours at 25° C. and filtered. Filter cake is washed by flashing with 3400 ml. of tert.-butyl alcohol of 25° C. The cake is then dried at 30–40° C. in an oven. The product (the triethylamine salt of α-aminobenzylpenicillin) is recovered in a 90% yield (1400 g.).

The triethylamine salt of α-aminobenzylpenicillin (1000 g.) and 78 ml. of triethylamine are added to 16 liters of methylene chloride and the mixture is stirred for 5 to 15 minutes. The slurry is filtered and the filter cake is washed with 4 liters of methylene chloride. The filtrate is then added with stirring to 950 ml. of sodium 2-ethylhexanoate in butanol. The sodium salt of α-aminobenzylpenicillin begins to precipitate as a crystalline salt. The mixture is stirred for one hour at 20–25° C. and for another hour at from 0–5° C. It is then filtered and the filter cake is washed with 2 liters of methylene chloride and flashed with Skellysolve B to avoid condensing moisture on the cake. The product (720 g.) is vacuum dried at 40° C.

*Example 4*

α - Aminobenzylpenicillin - β - naphthalene sulfonate (2000 g.) is added to 6000 ml. of acetonitrile with stirring. The temperature of the slurry is adjusted to from 20–25° C. and 1500 ml. of triethylamine are added. The mixture is stirred for 3 hours at 20–25° C. and the temperature is then lowered to from 0–5° C. for one hour. The product (the triethylamine salt of α-aminobenzylpenicillin) is recovered by filtration and flashed with 3400 ml. of cold acetonitrile. The cake is then dried at 30–40° C. in an air circulation oven. About 1300 gm. of product is thereby obtained.

The triethylamine salt of α-aminobenzylpenicillin (1000 gm.) is added to 78 ml. of triethylamine in 16 liters of methylene chloride and the mixture is stirred for about 10 minutes. The slury is then filtered and the filter cake is washed with 4 liters of methylene chloride. The filtrate is then added with stirring to 950 ml. of sodium 2-ethylhexanoate in butanol. The sodium salt of α-aminobenzylpenicillin begins to crystallize from the solution in less than 10 minutes. The reaction mixture is stirred for one hour at 0–5° C. It is then filtered and the filter cake is washed with 2 liters of methylene chloride and flashed with Skellysolve B. The product (720 g.) is then dried.

*Example 5*

Injectable intramuscular preparations are prepared by separately reconstituting amphoteric α-aminobenzylpenicillin and the sodium salt of α-aminobenzylpenicillin with distilled water. In the table below preparation A contains 500 mgs. of amphoteric α-aminobenzylpenicillin on an activity basis suspended in 4 mls. of water. Preparation B contains 500 mgs. of the sodium salt of α-aminobenzylpenicillin on an activity basis dissolved in 2 mls. of water.

The table below reports the average blood levels which are obtained in cross-over tests on ten human subjects. On the first day, preparation A is administered intramuscularly in a single dose to five subjects and preparation B is administered intramuscularly in a single dose to five different subjects and the blood levels are determined at intervals over a period of eight hours. On the next day the subjects who the preceding day received preparation A were administered preparation B intramuscularly in a single dose; and the subjects who the preceding day had received preparation B were administered preparation A intramuscularly in a single dose and the blood levels were again determined periodically over a period of eight hours. The average blood levels thus obtained were reported in the following table:

BLOOD LEVELS IN MAN

| Hours | ¼ | ½ | 1 | 1½ | 2 | 3 | 4 | 6 | 8 |
|---|---|---|---|---|---|---|---|---|---|
| Preparation A | 1.34 | 2.46 | 2.38 | 2.40 | 2.44 | 2.11 | 1.84 | 1.25 | 0.81 |
| Preparation B | 5.11 | 6.79 | 8.24 | 7.14 | 5.44 | 2.85 | 1.53 | 0.46 | 0.20 |

It is obvious by inspection of the above table that in the early hours of administration higher blood levels of α-aminobenzylpenicillin were obtained by the use of the sodium salt of α-aminobenzylpenicillin.

*Example 6*

Replacement of the α-aminobenzylpenicillin in Example 1 with

α-Amino-4-diethylaminobenzylpenicillin,
α-Amino-4-trifluoromethylbenzylpenicillin,
α-Amino-2,4-dibromobenzylpenicillin,
α-Amino-2-nitrobenzylpenicillin,
α-Amino-3-methylbenzylpenicillin,
α-Amino-4-sulfamylbenzylpenicillin,
α-Amino-2-iodobenzylpenicillin,
α-Amino-4-t-butylbenzylpenicillin, and
α-Amino-2-acetamidobenzylpenicillin, respectively, results in the formation of the corresponding α-Amino-4-diethylaminobenzylpenicillin sodium salt,
α-Amino-4-trifluoromethylbenzylpenicillin sodium salt,
α-Amino-2,4-dibromobenzylpenicillin sodium salt,
α-Amino-2-nitrobenzylpenicillin sodium salt,
α-Amino-3-methylbenzylpenicillin sodium salt,
α-Amino-4-sulfamylbenzylpenicillin sodium salt,
α-Amino-2-iodobenzylpenicillin sodium salt,
α-Amino-4-t-butylbenzylpenicillin sodium salt, and
α-Amino-2-acetamidobenzylpenicillin sodium salt.

I claim:
1. A method for the production of the sodium salt of α-aminobenzylpenicillin which comprises:
dissolving triethylamine in substantially anhydrous methylene chloride and contacting the solution with an α-aminobenzylpenicillin whereby a solution of the triethylamine salt of α-aminobenzylpenicillin in methylene chloride containing about 0.06 to 0.10% water is formed;
contacting said solution of the triethylamine salt of α-aminobenzylpenicillin with sodium 2-ethylhexanoate whereby the sodium salt of α-aminobenzylpenicillin is formed;
and recovering said reaction product.
2. The method of claim 1 wherein said α-aminobenzylpenicillin is D-(—)-α-aminobenzylpenicillin.

References Cited by the Examiner

UNITED STATES PATENTS

| | | | |
|---|---|---|---|
| 2,530,488 | 11/1950 | Rigler | 260—239.1 |
| 2,684,363 | 7/1954 | Watchel et al. | 260—239.1 |
| 2,691,651 | 10/1954 | Sheehan et al. | 260—239.1 |
| 2,803,583 | 8/1957 | Peterson et al. | 167—65 |
| 2,966,442 | 12/1960 | Elias et al. | 167—65 |
| 2,985,648 | 5/1961 | Doyle et al. | 260—239.1 |
| 3,040,033 | 6/1962 | Celmer | 260—239.1 |
| 3,142,673 | 7/1964 | Hobbs | 260—239.1 |
| 3,180,862 | 4/1965 | Silvestri et al. | 260—239.1 |

HENRY R. JILES, *Acting Primary Examiner.*

NICHOLAS S. RIZZO, *Examiner.*

J. W. ADAMS, *Assistant Examiner.*